UNITED STATES PATENT OFFICE.

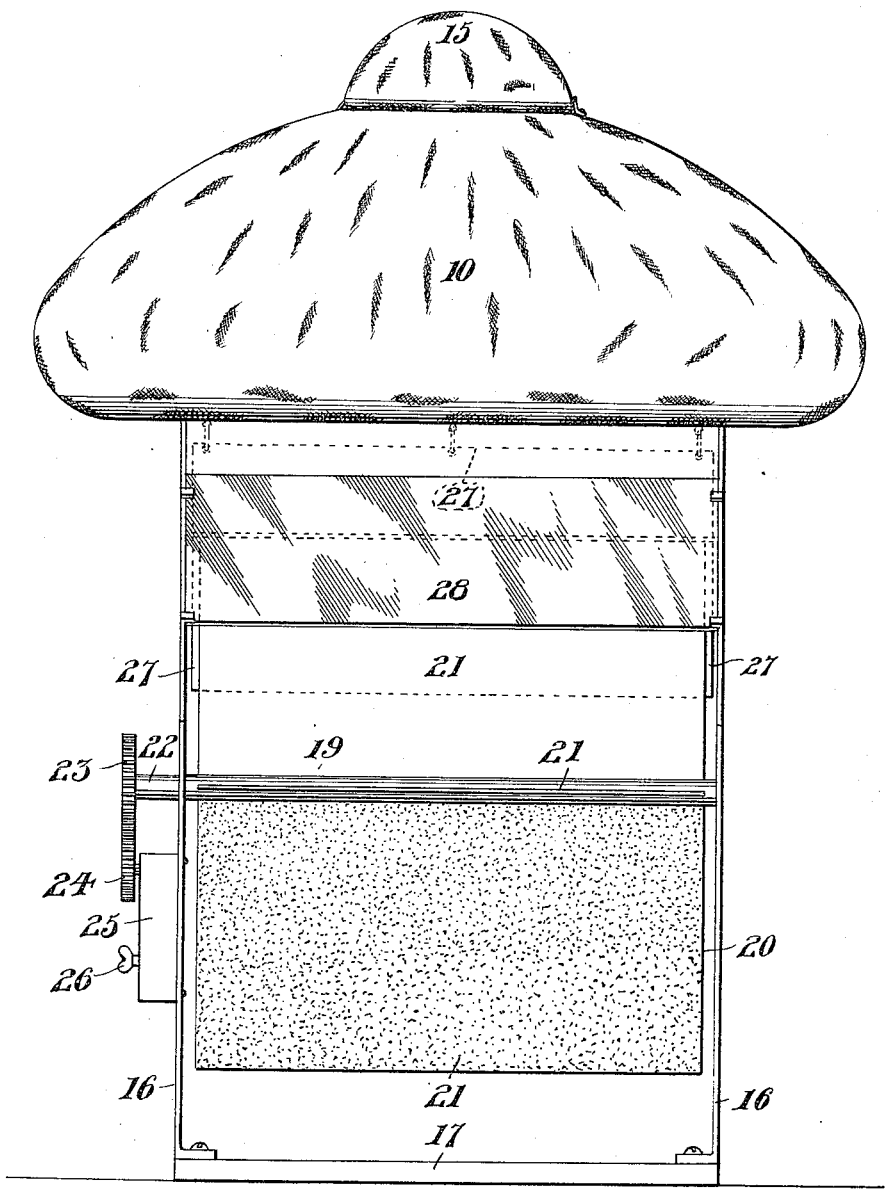

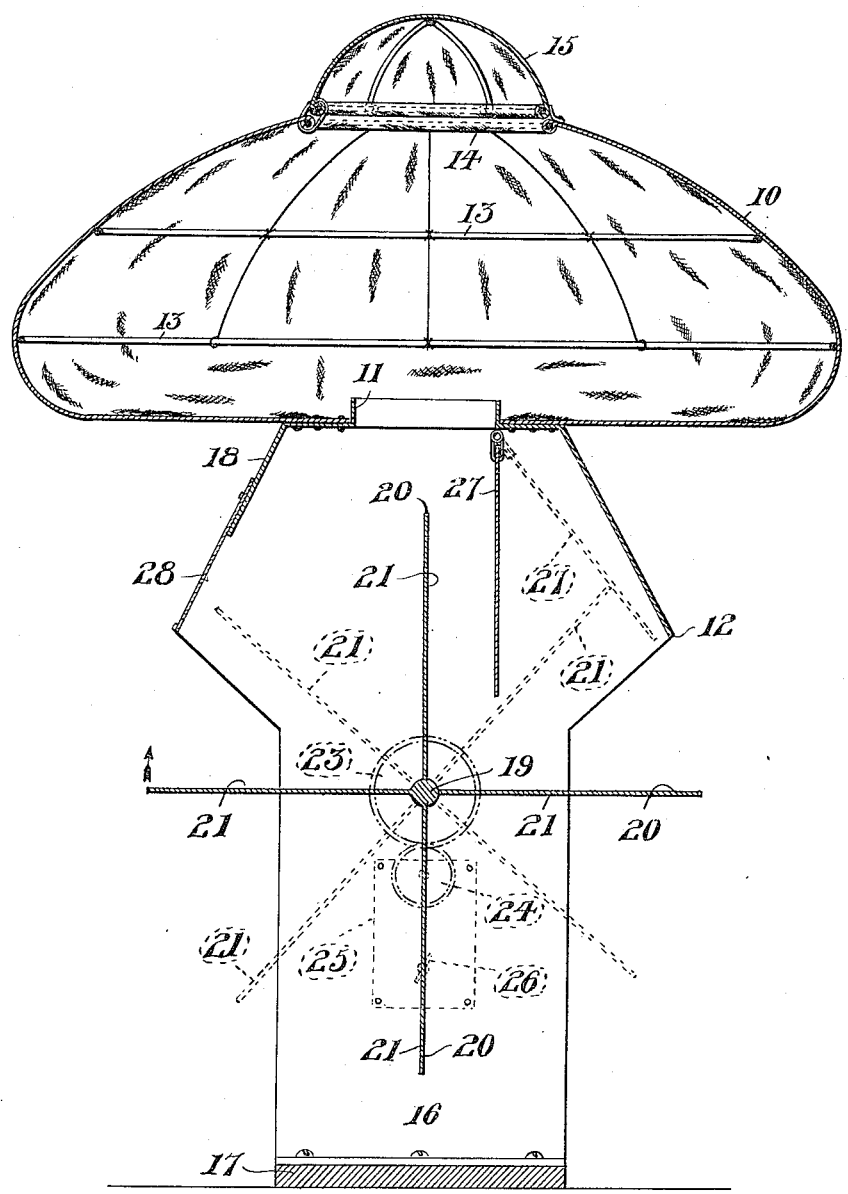

ANDRAS CSIZMAR, OF DUQUESNE, PENNSYLVANIA.

FLY-TRAP.

1,148,660.  Specification of Letters Patent.  Patented Aug. 3, 1915.

Application filed November 14, 1914. Serial No. 872,157.

*To all whom it may concern:*

Be it known that I, ANDRAS CSIZMAR, subject of the King of Hungary, residing at Duquesne, in the county of Allegheny and State of Pennsylvania, have invented certain new and useful Improvements in Fly-Traps, of which the following is a specification.

This invention relates to certain new and useful improvements in fly traps.

The primary object of this invention is to provide a trap for flies and other insects which is adapted to influence the flies to go into the trap during their flight and when attracted thereto.

A further object is to provide a trap which is adapted to hold the caught flies in their live state with an entrance having mechanically moved blades for sweeping the flies into the trap after they have been influenced to go into proximity therewith by attracting bait carried by the blades.

A still further object is to provide a trap consisting of a container having a removable closure and also formed with an insect entrance in which is positioned a power driven fan for impelling the flies into the container.

With these general objects in view and others that will appear as the nature of the invention is better understood, the same consists in the novel combination and arrangement of parts to be hereinafter more fully described, illustrated in the accompanying drawings and set forth in the appended claim.

In the drawings forming a part of this application and in which like-designating characters refer to corresponding parts throughout the several views, Figure 1 is a side elevational view of the device, and Fig. 2 is a central longitudinal sectional view thereof.

Referring more in detail to the drawings, the trap broadly consists of a balloon shaped container 10 adapted to receive flies through an inlet 11 and an entrance member 12 leading to the said inlet. The container is preferably formed of a flexible covering mounted upon an internally carried frame 13 and has a fly outlet 14 which is provided with a hinged cap 15.

The entrance 12 is formed of side plates 16 connected together at their bottom by a base plate 17 and having their tops secured to the receptacle 10. The plates 16 have opposite sloping sides 18 connecting the same together adjacent the tops thereof and thus forming an outwardly flaring approach to the receptacle inlet 11. A fan or wheel 19 is journaled between the plates 16 and beneath the upper flared portion of the approach and has radially projecting wings or blades 20 which are provided with an attracting coating 21 serving as a bait for the insects.

The wheel has a projecting axle portion 22 at one side of the approach to which a gear 23 is attached being in constant mesh with a smaller gear 24 connected to suitable clock-work adapted to revolve the gear 24 and which clock work is positioned within a casing 25 mounted upon the adjacent plates 16.

The clock work is adapted to be wound up by means of the key 26 which will result in turning the gears 24 and 23 and thus revolving the wheel 19 in the direction indicated by the arrow in Fig. 2. The insects being attracted by the bait 21 into the path of travel of the blades 20, the turning of the wheel will sweep or influence the flight of the insects upwardly and into the flared approach 18. A flap or plate 27 is swingingly mounted beneath the receptacle 10 and depends into the flaring approach and within the path of travel of the wheel blades 20, so that each blade will engage the flap 27 in the manner shown by dotted lines in Fig. 2 and prevent the escape of the flies.

The forward side of the entrance being that side into which the blades enter upon their upward movement, has substantially one-half of its sloping side 18 formed of a transparent material such as a mica or glass plate 28 so that the front side of the flared entrance has a light interior designed against frightening the flies.

It will thus be seen that by means of a bait carried by the blades which are revolving, the flies will be attracted thereby and will thus be induced and assisted in entering the trap entrance and being prevented from escaping therefrom, will pass upwardly into the receptacle still under the influence of the fan. It will be noted that the bait may be provided upon both sides of the blades or only upon the undersides thereof and so as not to be contacted by the insects, but it will be understood that the bait may be of such form as to attract the insects but not to secure or stick the insects onto the blades. The speed of movement of the wheel may be regulated as is found desirable.

While the form of the invention as herein shown and described is the preferred embodiment thereof, it is nevertheless to be understood that minor changes may be made without departing from the spirit and scope as claimed.

What I claim as new is:—

A trap comprising a balloon shaped fly receptacle having an entrance opening in the bottom thereof, spaced plates secured to the bottom of said receptacle at points on opposite sides of said opening, a base plate connected between the bottoms of said spaced plates, a wheel having radial blades and journaled between the said spaced plates, driving means for said wheel positioned exteriorly of one of said spaced plates, bait means positioned upon the blades of said wheel, opposite side plates secured between the upper portions of said spaced plates and to the bottom of said receptacle and outwardly flaring from said entrance opening, one of said flaring side plates having a transparent portion and positioned at the forward side of the device, and a flap plate hinged to the bottom of said receptacle adjacent one side of the entrance thereto and depending between said spaced plates and side plates and within the path of travel of the blades of said wheel.

In testimony whereof I affix my signature in presence of two witnesses.

ANDRAS CSIZMAR.

Witnesses:
 FRED GERDTS,
 STEVE SHIPOSH.

Copies of this patent may be obtained for five cents each, by addressing the "Commissioner of Patents, Washington, D. C."